(12) United States Patent
Yuan

(10) Patent No.: US 6,265,357 B1
(45) Date of Patent: Jul. 24, 2001

(54) HIGH PRECISION, HIGH SURFACE FINISH BROACHING METHOD, TOOL, AND LUBRICANT/COOLANT

(75) Inventor: Lin-Sen Yuan, Calabasas, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 08/267,683

(22) Filed: Jun. 28, 1994

Related U.S. Application Data

(62) Division of application No. 08/083,244, filed on Jun. 24, 1993, now Pat. No. 5,503,506.

(51) Int. Cl.[7] .............................................. C10M 125/22
(52) U.S. Cl. ................... 508/168; 508/167; 72/42
(58) Field of Search ..................... 252/18, 495; 508/167, 508/168

(56) References Cited

U.S. PATENT DOCUMENTS

| | | | |
|---|---|---|---|
| 1,945,535 | 2/1934 | Schiltz | 90/33 |
| 2,392,481 | 1/1946 | Kaplan et al. | 29/95.1 |
| 3,170,878 | * 2/1965 | Armstrong | 252/18 |
| 3,624,242 | 11/1971 | Steinacker | 252/15 |
| 3,836,467 | 9/1974 | Jones | 252/49.5 |
| 4,038,730 | 8/1977 | Tersch | 29/95.1 |
| 4,498,361 | 2/1985 | Grace | 76/101 R |
| 4,808,324 | * 2/1989 | Périard et al. | 252/18 |
| 4,996,108 | * 2/1991 | Divigalpitiya et al. | 428/411.1 |
| 5,116,521 | * 5/1992 | Fujii et al. | 252/18 |
| 5,277,831 | * 1/1994 | Hanano | 252/18 |
| 5,279,749 | * 1/1994 | Hanano | 252/18 |
| 5,294,355 | * 3/1994 | King et al. | 252/49.3 |

FOREIGN PATENT DOCUMENTS

| | | |
|---|---|---|
| 0412 788 | 2/1991 | (EP) . |
| 1 126 236 | 11/1956 | (FR) . |
| 1444345 | 9/1966 | (FR) . |
| 2134388 | 12/1972 | (FR) . |
| 435 190 | 10/1935 | (GB) . |
| 551 551 | 3/1943 | (GB) . |
| 764 932 | 1/1957 | (GB) . |
| 852831 | 11/1960 | (GB) . |
| 2202812 | 8/1977 | (GB) . |

OTHER PUBLICATIONS

Machine and Tooling, vol. 34, No. 10, Oct. 1963 pp. 32–34, "Broaching Deep Holes in Cast Iron", A. G. Kaleshin et al.
*Journal of Tongji University*, 1985, "A New Broaching Technology for Drilling Small Deep Precise Holes", Y. Linsen, pp. 117–125, month not available.

* cited by examiner

*Primary Examiner*—Ellen M. McAvoy
(74) *Attorney, Agent, or Firm*—V D Duraiswamy; M W Sales

(57) ABSTRACT

A broaching tool has a plurality of cutting teeth for broaching a small, deep hole with high precision and surface finish. Three to eight teeth are engaged in the hole for cutting at any one time. For broaching sticky metals such as stainless steel, each cutting tooth has a face angle, backoff angle and rise which are sufficiently large to prevent thermal hardening of the hole surface. A ring is provided between the front face and land of each cutting tooth having a width selected to prevent formation of axial and ring-shaped tool traces. V-shaped notches having a large radial angle and a small backoff angle are formed in the land of each cutting tooth to break chips and prevent clogging. The tool further includes a rear pilot having a plurality of smoothing teeth with a diameter larger than the finished diameter of the hole. A set of rough and fine broaching tools can be provided, with the fine tool being processed to convert it to a rough tool when it is worn beyond tolerance. A lubricant/coolant including molybdenum disulfide powder dispersed in a liquid suspension is coated on the tool during broaching.

3 Claims, 2 Drawing Sheets

HIGH PRECISION, HIGH SURFACE FINISH BROACHING METHOD, TOOL, AND LUBRICANT/COOLANT

This is a division of application Ser. No. 08/083,244 filed Jun. 24, 1993, now U.S. Pat. No. 5,503,506 Apr. 2, 1996.

BACKGROUND OF THE INVENTION

1. Field of the Invention

The present invention generally relates to the art of machining, and more specifically to a broaching method, tool and lubricant/coolant for forming small, deep holes with high precision and surface finish.

2. Description of the Related Art

Machining of small, deep holes with high precision and surface finish is a problem which has persisted in the art. A small deep, precise hole can be defined as having a diameter of less than 12 millimeters, aspect (depth/diameter) ratio of at least 5, precision of ISO standard H6-H7, angular tolerance of H6, surface roughness of 0.4–0.1 micrometer, and bore out-of-roundness, cylindrical out-of-roundness and taper which are within ½–⅓ of the tolerance.

Prior art methods for machining small, deep holes include drilling and expanding followed by rough and fine reaming, rough and fine boring, or boring and grinding. Other methods include honing and electron discharge machining (EDM). These prior art methods suffer from the drawbacks of multiple complex machining processes, extreme difficulty in obtaining satisfactory precision, surface finish and exchangeability, low productivity, poor quality control, high reject rate and often conical deformation at the exit ends of the holes.

Broaching is a process for machining holes, slots and grooves with high productivity compared to the methods described above. Broaching can be used for forming holes in numerous metals including low-carbon steel, low-carbon alloy steel, phosphor bronze, pure aluminum, stainless steel, titanium alloys and other materials.

A broaching tool generally includes an elongated body on which a number of parallel cutting teeth are formed or attached. The diameters of the teeth progressively increase from the front end to the rear end of the tool by an increment known as the "rise", such that each tooth cuts slightly deeper than the previous tooth.

A basic broaching tool and method are described in U.S. Pat. No. 1,945,535, entitled "BROACHING TOOL", issued Feb. 6, 1934 to B. Schlitz. A method of fabricating a basic broaching tool is described in U.S. Pat. No. 4,498,361, entitled "BROACH MANUFACTURING METHOD", issued Feb. 12, 1985 to W. Grace.

Broaching as practiced conventionally has not achieved its potential for forming small, deep holes with high precision and surface finish. This is due to a number of fundamental problems which have remained unsolved.

As the broaching tool is forced through the workpiece, high friction and specific pressure between the front face of each cutting tooth and the compressed material ahead of the tooth generate a large amount of heat which results in the formation of a layer of material which clings to the front face of the tooth and is known as a "built-up edge".

A broaching tool is preferably designed such that the built-up edge will attain a relatively small critical mass and then disintegrate or fracture off. If this action occurs, a smooth hole can be formed. A broaching tool which is specifically designed to minimize built-up edge formation is described in U.S. Pat. No. 2,392,481, entitled "MACHINE TOOL CUTTER", issued Jan. 8, 1946 to L. Kaplan et al.

Certain "sticky" materials such as stainless steel exhibit high elasticity, percentage elongation and plastic deformation. The frictional forces and pressures between the broaching tool and the workpiece are especially high for these materials, causing scaling of the surface of the hole and further enabling the built-up edge to grow to an undesirably large size. This causes the diameter of the hole to progressively increase, and creates a "nibbled" surface finish with a high degree of roughness.

If the built-up edge grows to a large size and then fractures off, the hole will have a surface with band-shaped scaling. Because cooling and lubrication are relatively ineffective in the lower portion of a deep hole which is being formed by vertical broaching, the scaling bands generally appear in the lower half of the hole.

Stainless steel is not only highly resilient and susceptible to plastic deformation, it also tends to be surface hardened by cutting. This causes the teeth in the rear portion of the broaching tool to slip, rather than to cut, increasing the difficulty of machining and degrading the surface quality.

The front face of each tooth has a "face angle", and the rear face or land of each tooth has a "backoff angle". The face and backoff angles are generally made as large as practical to increase the cutting efficiency and minimize heat generation. Prior art broaching tools are generally not guided smoothly through holes and tend to vibrate laterally, creating ring-shaped tool traces in the hole surfaces.

Another problem with sticky metals such as stainless steel is that built-up edges can also be formed between the lands of the cutting teeth and the surface of the hole. This will be exacerbated if the backoff angle is too small and/or the smoothness of the land is low. The built-up edges on the lands of the teeth fracture off unevenly, causing axial tool traces on the surfaces of the holes.

Prior art broaching tools have been formed with a rear "pilot" including a number of non-cutting rings having a diameter which is slightly smaller than the diameter of the finished hole. The purpose of the rear pilot is to smoothly guide the rear end of the broaching tool out of the hole. However, due to the clearance between the rings and the hole, the tool is able to move or vibrate radially, causing the exit end of the hole to be deformed into a conical shape. In extreme cases, the last ring of the rear pilot can nibble off a piece of metal from one side of the hole.

Prior art broaching tools for small, deep holes have conventionally been very long and thin. Fabrication of these tools is difficult, since they tend to bend during heat treatment and machining. A broaching tool which is not extremely straight cannot form a hole with high precision and surface finish.

Prior art lubricants and coolants based on conventional cutting oils are incapable of adequately reducing the frictional forces, temperatures and pressures created during broaching small, deep holes. This has heretofore limited the precision and surface finish of holes formed by broaching.

SUMMARY OF THE INVENTION

A broaching tool embodying the present invention has a plurality of cutting teeth for broaching small, deep holes with high precision and surface finish. Three to eight teeth are engaged in a hole for cutting at any one time. Each cutting tooth has a face angle, backoff angle and rise which are sufficiently large to prevent hardening of the hole surface.

The diameter increase or the thickness of material to be removed by broaching (the sum of the rises of the individual cutting teeth) is optimally selected to maximize the surface finish of the holes. The cutting teeth are finished to a high smoothness, which further increases the surface finish.

A cylindrical ring is provided between the front face and the land of each cutting tooth having a width selected to prevent formation of axial and ring-shaped tool traces. V-shaped notches having a large radial angle and a small axial backoff angle are formed in the land of each cutting tooth to break chips and prevent clogging.

The tool further includes a rear pilot having a plurality of smoothing teeth with a diameter slightly larger than the finished diameter of the hole. The rear pilot smoothly guides the rear end portion of the tool out of the hole, preventing conical deformation and nibbling. The smoothing teeth also compress the material at the surface of the hole, increasing the surface finish.

A set of two or more broaching tools ranging from rough to fine can be provided, with the fine tools being processed to convert them to progressively rougher tools when they become worn beyond tolerance. This recycling method substantially reduces the time and cost of fabricating broaching tools, thereby reducing the cost and increasing the efficiency of broaching operations. It also reduces the length of each broach and thereby the danger of bending during heat treating and machining.

A lubricant/coolant including molybdenum disulfide powder dispersed in a liquid suspension is coated on the tool prior to use. The present lubricant/coolant is substantially more effective than prior art lubricant/coolants based on conventional cutting oils, especially in the lower portions of holes, and increases the surface finish which can be achieved by broaching.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
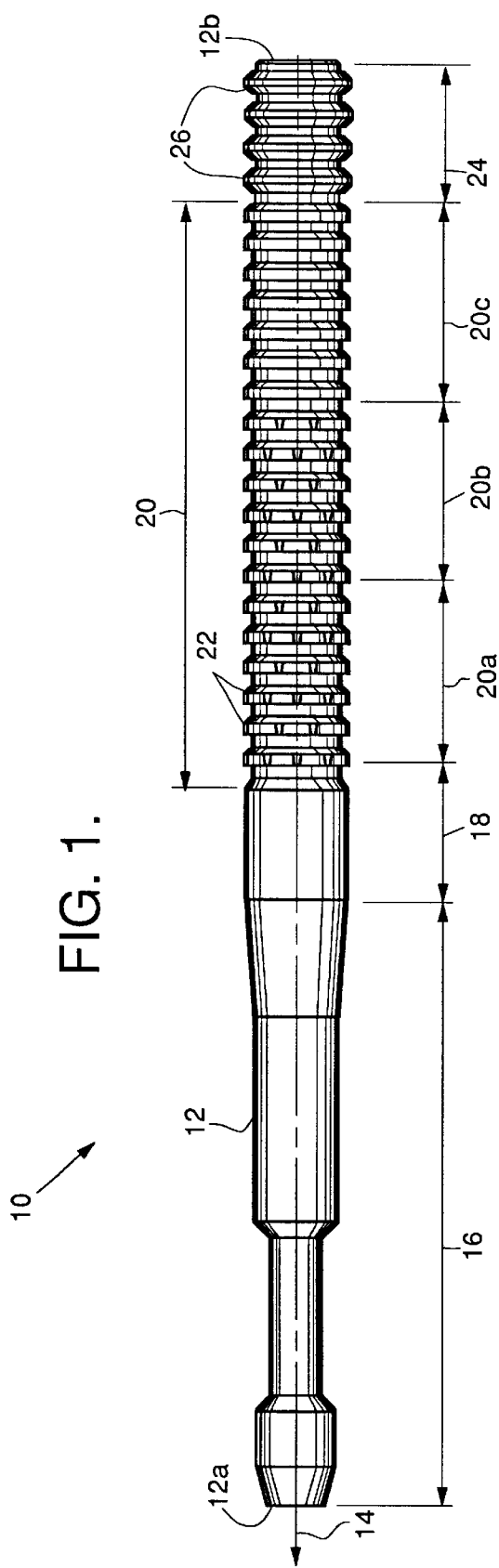
FIG. 1 is a side elevation illustrating a broaching tool embodying the present invention.

A pull broaching tool 10 embodying the present invention is illustrated in FIG. 1 for broaching small, deep precision holes with high surface finish. The present tool 10 is capable of broaching holes having a diameter of approximately 5–50 millimeters, aspect (depth/diameter) ratio of approximately 1–25, precision of ISO standard H6-H7, angular tolerance of H6, surface roughness of 0.1–0.4 micrometer, and bore out-of-roundness, cylindrical out-of-roundness and taper which are within ½–⅓ the tolerance.

The tool 10 includes a body 12 having a front end 12a and a rear end 12b, and is intended to be pulled leftwardly as indicated by an arrow 14 through a hole for broaching. The left end portion of the body is formed into a pull shank 16 to enable it to be gripped by the jaws of a conventional broaching machine (not shown).

The tool 10 is especially designed for vertical broaching of round holes, but the invention is not so limited. A broaching tool embodying the invention can be designed with, for example, a spiral shape, or with a rectangular shape for milling slots or open grooves.

A cylindrical front pilot 18 is formed on the body 12 rearward (rightward) of the pull shank 16. The front pilot 18 has a diameter which is equal to or slightly smaller than the initial diameter of a hole to be broached for smoothly guiding the tool 10 into the hole.

A cutting section 20 including a plurality of annular cutting teeth 22 is formed in the body 12 rearward of the front pilot 18. The cutting section 20 can include a continuous set of cutting teeth of the same type, or can, as illustrated, include a roughing section 20a, a semi-finishing section 20b and a finishing section 20c having teeth of different types. A rear pilot 24 including rings or smoothing teeth 26 is formed between the cutting section 20 and the rear end 12b of the body 12.

A preferred material for the broaching tool 10 is CPM HSS M4, although the invention is not so limited, and the tool 10 can be formed of any suitable material. The cutting teeth 22 and smoothing teeth 26 preferably have a hardness of approximately Rockwell C 65–67, whereas the other portions of the tool 10 have a hardness of approximately Rockwell C 45–50.

Figure 2:
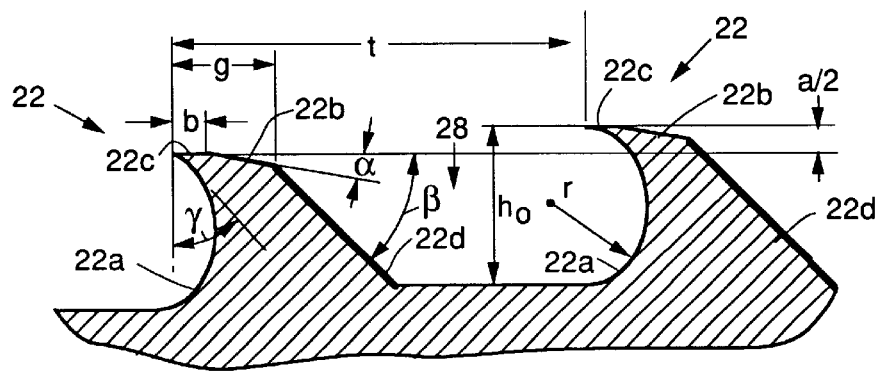
FIG. 2 is an enlarged sectional view illustrating the geometry of a cutting tooth of the broaching tool.

The geometry of the teeth 22 of the cutting section 20 is illustrated in FIG. 2. Each tooth 22 includes a front cutting face 22a having a face angle γ and a rear face or land 22b having a width g and a backoff angle α. A cylindrical ring 22c having a width b is formed between the front face 22a and the land 22b.

The teeth 22 are axially spaced from each other by a pitch t. The diameters of the teeth 22 progressively increase from the front end 12a toward the rear end 12b of the body 12 by an incremental amount or rise a. A chip slot or gullet 28 is provided between adjacent teeth 22, having a depth $h_0$ and a radius r which blends into the face angle γ of the front face 22a. A conical wall 22d provides a transition from the rear end of the land 22b and the bottom of the gullet 28 at an inclination angle β of typically 45%.

The dimensions of the teeth 22 are selected in accordance with the finished diameter D and depth L of the hole to be broached, and the material of the workpiece in which the hole is to be formed. The number Z of active teeth 22, or the number of teeth 22 which are disposed in the hole and actively engaged in cutting at any one time, is selected to be between three and eight. In other words, the pitch t is between ⅓ and ⅛ the depth L of the hole.

If less than three teeth are engaged in the hole, the broaching operation can be unstable, resulting in unsatisfactory precision and surface finish. If more than eight teeth 22 are engaged in the hole, the forces generated can be excessive, also producing unsatisfactory precision and surface finish. In an extreme case, excessive broaching forces can result in damage to the broaching tool 10, which is relatively long and thin.

The pitch t can be calculated in accordance with an empirically derived formula as $t=1.2(L)^{1/2}$. The number Z of active teeth 22 is preferably selected in accordance with the aspect ratio (depth L/diameter D) of the hole as $Z=(L/t)+1$, as tabulated in TABLE I. All linear dimensions are in millimeters, and all angles are in degrees.

TABLE 1

NUMBER OF ACTIVE TEETH

| L | t | Z | L | t | Z |
|---|---|---|---|---|---|
| 14 | 4.5 | 3 | 55 | 10 | 5 |
| 16 | 5 | 3 | 60 | 11 | 5 |
| 18 | 5.5 | 3 | 70 | 11 | 6 |
| 20 | 6 | 3 | 80 | 12 | 6 |
| 25 | 6 | 4 | 90 | 12 | 7 |
| 30 | 7 | 4 | 100 | 13 | 7 |
| 35 | 8 | 4 | 110 | 13 | 8 |
| 40 | 8 | 4 | 125 | 15 | 8 |
| 45 | 8.5 | 5 | 140 | 17 | 8 |
| 50 | 9 | 5 | 160 | 18 | 8 |

The rise a, face angle $\gamma$ and backoff angle $\alpha$ of the teeth 22 in the roughing section 20a are selected in accordance with the material and strength $\sigma$ (in kilograms per square millimeter) of the workpiece as tabulated in TABLE II. Generally, the rise a, face angle $\gamma$ and backoff angle $\alpha$ are made as large as practical to reduce the cutting force and heat, especially with materials such as stainless steel with which this effect can readily occur.

For soft and pliable materials such as No. 15–20 steel, phosphor bronze and pure aluminum, the rise a should be relatively small, on the order of 0.01–0.02 millimeter. The rise a of the teeth 22 in the semi-finishing section 20b should be 0.005–0.01 millimeter, whereas the teeth 22 in the finishing section 20c will typically not have any rise a.

For resilient materials such as stainless steel which are hardened by cutting, the rise a should be larger, on the order of 0.025–0.03 millimeter to minimize heat generation, formation of built-up edge and scaling.

If the broaching tool 10 is used for broaching a precision hole in a thin-wall tube, the teeth 22 in the finishing section 20c should have a rise a of 0.005–0.0075 millimeter to counteract the resilient force of the tube wall.

TABLE II

CUTTING TOOTH DIMENSIONS

| MATERIAL | $\sigma$ | a | $\gamma$ | $\alpha$ |
|---|---|---|---|---|
| CARBON STEEL, | ≈50 | 0.03–0.04 | | |
| LOW ALLOY STEEL | 50–60 | 0.04–0.05 | 8°–15° | 1°–1.5° |
| | >75 | 0.02–0.04 | | |
| HIGH ALLOY STEEL | ≈80 | 0.03–0.04 | 6°–8° | 0.5°–1° |
| | >80 | 0.02–0.03 | | |
| LOW CARBON STEEL | | 0.01–0.025 | 15°–20° | 3°–4° |
| STAINLESS STEEL | | 0.02–0.03 | | |
| ALUMINUM ALLOY | | 0.04–0.08 | 15°–18° | 2°–3° |
| CAST IRON | | | | |
| (GREY) | | 0.04–0.08 | 6°–8° | 1.5°–2.5° |
| (WROUGHT) | | 0.05–0.10 | | |
| BRONZE | | 0.01–0.025 | 15°–18° | 2°–3° |
| BRASS | | 0.06–0.12 | 3°–5° | 0.50°–1.5° |

The width b of the ring 22c is 0.10–0.15 millimeter for the teeth 22 in the roughing section 20a, 0.15–0.20 for the teeth 22 in the semi-finishing section 20b and the finishing section 20c. Proper selection of the ring width b is necessary to prevent wave and ring shaped tool traces in the surface of a hole.

Figure 3:
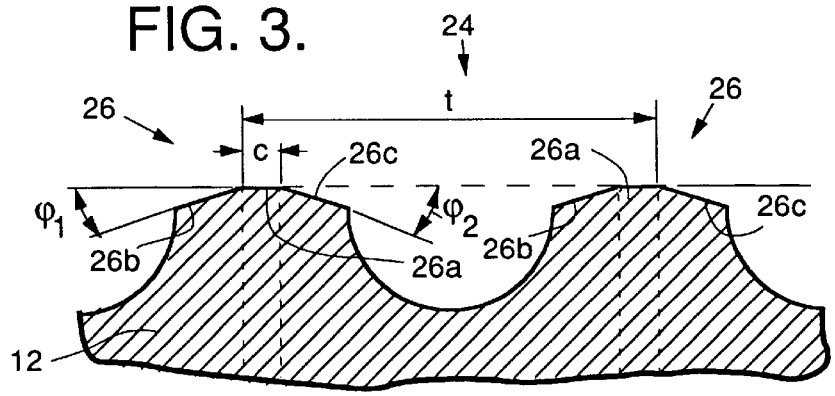
FIG. 3 is an enlarged sectional view illustrating the geometry of a smoothing tooth of a rear pilot of the broaching tool.

FIG. 3 illustrates the geometry of the rings or smoothing teeth 26 of the rear pilot 24. Four to six smoothing teeth 26 are provided, with the length of the rear pilot 24 being 1.5–2.5 times the finished diameter D of the hole. Each tooth 26 includes a cylindrical ring 26a having a width c of 0.15–0.20 millimeter, a front face 26b having a face angle $\phi 1$ of approximately 3°–5° and a rear face 26c having a rear face angle $\phi 2$ of approximately 5°–8°.

The diameter of the rings 26a is selected to be larger than the finished diameter D of the hole by approximately 0.01 millimeter for steel, and 0.02–0.04 millimeter for cast iron. The negative clearance or press fit between the smoothing teeth 26 of the rear pilot 24 and the surface of the hole prevents conical deformation and nibbling of the exit end of the hole, and improves the surface finish by compressing the material at the surface of the hole.

The front faces, rear faces and rings of the teeth 22 and 26 should be ground as smoothly as possible to maximize the surface finish of the broached hole. Typically, these surfaces should have a roughness of less than 0.1–0.2 micrometer, with a smooth transition between the ring 26a and the front and rear faces 26b and 26c.

A method of broaching using the present tool 10 generally includes the steps of forming a hole through a workpiece, and then pulling the tool 10 through the hole to increase the diameter and improve the precision and surface finish of the hole. Preferably, a preliminary hole will be formed by drilling, and expanded by reaming, boring or rough broaching to form a secondary hole. The intended finished diameter D of the broached hole is larger than the diameter of the secondary hole by an amount $\Delta D$ which is selected in accordance with the precision and surface finish of the secondary hole.

Where the secondary hole is formed by rough reaming, rough boring or another method which produces a surface roughness of approximately 6.4 micrometer, the diameter increase is approximately $\Delta D - 0.008D + 0.05(L)^{1/2}$ for steel, and $\Delta D = 0.005D + 0.05(L)^{1/2}$ for cast iron.

Where the secondary hole is formed by fine reaming, fine boring or another method which produces a surface roughness of approximately 1.6 micrometer, the diameter increase is approximately $\Delta D = 0.008D + 0.025(L)^{1/2}$ for steel, and $\Delta D = 0.005D + 0.025(L)^{1/2}$ for cast iron.

In all cases, the broaching tool should be maintained as concentric with the hole as possible. The higher the concentricity, the higher the precision and surface finish that can be achieved. The diameter increase $\Delta D$ to be accomplished by broaching and the precision of the finished hole are limited by the precision of the secondary hole, including geometric parameters such as straightness, ellipticity and taper.

Figure 5:
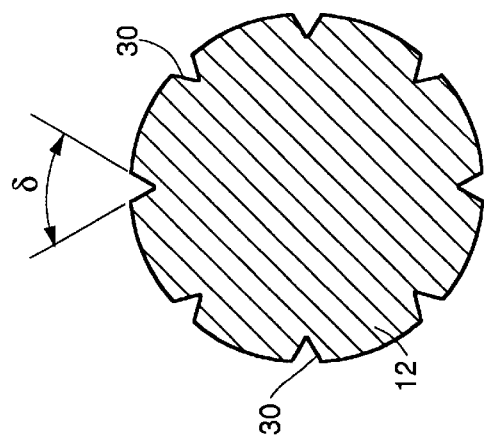
FIG. 5 is a sectional view of the broaching tool illustrating the the chip breaking notches.
Figure 4:
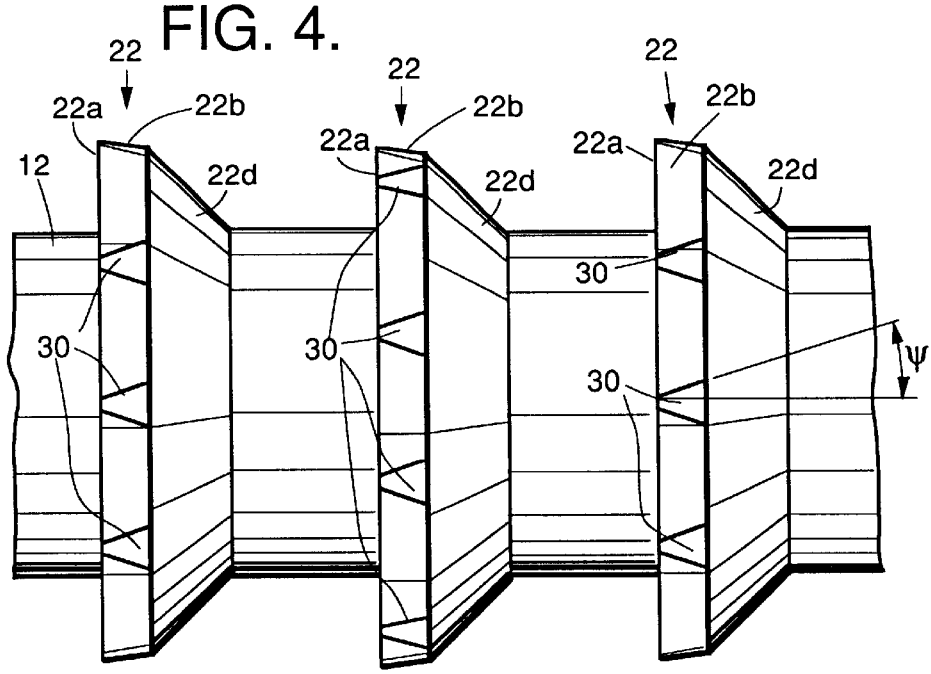
FIG. 4 is an enlarged side elevation illustrating chip breaking notches formed in lands of the cutting teeth.

As illustrated in FIGS. 4 and 5, a plurality of circumferentially spaced, axially extending V-shaped chip breaking notches 30 are formed in the land 22b and ring 22c of each cutting tooth in sections 20a and 20b. The notches 30 in adjacent teeth 22 are circumferentially staggered from each other. The notches 30 have flat walls which intersect at a large radial angle $\delta$ and sharp edges for increased strength and resistance to clogging by chips which are formed during broaching.

The geometry of the notches 30 is selected to break the chips into lengths of approximately 5–6 millimeters, which is optimal for reducing the broaching force and facilitating rolling and removal of the chips. The notches are provided with a small backoff angle $\psi$ to facilitate cutting and removal of the chips.

Each notch 30 has a radial angle $\delta$ of 60°–90° and a small backoff angle $\psi$ of approximately 1°–7°. The depth of each notch 30 is approximately 0.45–0.5 millimeter, and the width of each notch is approximately 0.5–0.6 millimeter.

The broaching tool 10 as illustrated in FIG. 1 includes three sections of cutting teeth of different types. Although suitable for numerous applications, if the hole to be broached is especially small and deep, the tool 10 of FIG. 1 must be very long and thin, and vulnerable to bending when processed by heat treatment and machining during fabrication.

This problem can be overcome in accordance with the invention by providing two, three or more broaching tools formed with teeth of two, three or more different types (e.g. rough, semi-finishing and finishing) respectively, rather than a single broaching tool formed with teeth of all of these types. Since each broach includes fewer teeth, it is shorter and less prone to bending during fabrication.

In accordance with a recycling method of the invention, a relatively rough broach and a relatively fine broach (the number and type of broaches is not limited to two) are fabricated and sequentially used for rough and fine broaching a hole. The fine broach is periodically inspected and, when it has been determined to have worn beyond the tolerance required for a fine broach, it is processed to convert it to a rough broach. This recycling method substantially reduces the time and cost of fabricating broaching tools, thereby reducing the cost and increasing the efficiency of broaching operations.

Prior art lubricant/coolants based on conventional cutting oils are not sufficiently effective to enable small, deep holes to be broached with high surface finish using conventional broaching tools, especially in the lower portions of the holes. Prior art lubricants are also ineffective in preventing chips from sticking to the cutting teeth.

A lubricant/coolant according to the present invention which overcomes the limitations of the prior art generally includes molybdenum disulfide powder dispersed in a liquid as a liquid suspension. The lubricant/coolant is coated on the broaching tool 10 during broaching, with care being taken to ensure that the slots 28 of the cutting teeth 22 are completely filled with the lubricant/coolant. In addition to providing superior lubrication and cooling and improved surface finish, the present lubricant/coolant extends the service life of the broaching tool 10.

Molybdenum disulfide ($MoS_2$) is advantageous in that it has good lubricity, adhesion, heat resistance and low friction under high compressive force. However, molybdenum disulfide is a powdery solid. In order to prevent suspended particles from precipitating in solution, it must be dispersed in a suitable liquid suspension.

A lubricant/coolant embodying the invention which is suitable for broaching carbon steel, alloy steel, aluminum, copper and other non-ferrous metals includes a water-based suspension of molybdenum disulfide powder dispersed in a soap emulsion. The preferred composition by volume is soap emulsion/molybdenum disulfide powder/water in a ratio of 1/1.0–1.5/2.0–2.5. The soap is preferably a sodium fatty-acidulate having the chemical composition [$C_8H_{13}$—$C_{18}H_{37}$]COONa, including 85% sodium fatty-acidulate and 15% water.

This lubricant/coolant is prepared by producing a soap emulsion by mixing soap and water until they become a thick cream. All of the molybdenum disulfide is then added to the soap emulsion. More water is added until the suspension has the consistency of dark ink. A suitable anticorrosive can be added if required in a particular application to produce the finished lubricant/coolant.

Another lubricant/coolant embodying the invention which is suitable for broaching stainless steel and other sticky metals includes dispersing molybdenum disulfide in a liquid to form a liquid suspension, with the liquid including kerosene, chloroparaffin and carbon tetrachloride ($CCl_4$). The preferred composition by volume is chloroparaffin/molybdenum disulfide powder/kerosene/carbon tetrachloride in a ratio of 1/1.0–1.5/2.0–2.5/0.03–0.07.

This lubricant/coolant is prepared by mixing chloroparaffin thick paste with molybdenum disulfide powder such that the molybdenum disulfide powder adheres to the chloroparaffin paste. Kerosene is added until the solution has the consistency of dark ink. Approximately 3%–5% carbon tetrachloride is then added to produce the finished lubricant/coolant.

While several illustrative embodiments of the invention have been shown and described, numerous variations and alternate embodiments will occur to those skilled in the art, without departing from the spirit and scope of the invention.

For example, the volume ratios of the present lubricant/coolants described above are preferred values, and should not be considered as limiting the scope of the invention. These ratios can be varied within substantial ranges as required for particular applications. It will be further understood that the present lubricant/coolants are not limited to broaching, and can be used for other cutting and machining operations.

Accordingly, it is intended that the present invention not be limited solely to the specifically described illustrative embodiments. Various modifications are contemplated and can be made without departing from the spirit and scope of the invention as defined by the appended claims.

I claim:
1. A lubricant and coolant, consisting essentially of:

molybdenum disulfide powder; and
a liquid in which the molybdenum disulfide powder is dispersed to form a liquid suspension wherein the liquid consists essentially of kerosene, chloroparaffin and carbon tetrachloride.

2. A lubricant and coolant as in claim 1, having the composition by volume of approximately chloroparaffin/molybdenum disulfide powder/kerosene/carbon tetrachloride in a ratio of 1/1.0–1.5/2.0–2.5/0.03–0.07.

3. A lubricant and coolant consisting essentially of molybdenum disulfide powder and a liquid in which the molybdenum disulfide powder is dispersed to form a liquid suspension, said liquid consisting essentially of kerosene, chloroparaffin, and carbon tetrachloride.

* * * * *